United States Patent
Yeung (10) Patent No.: US 10,067,723 B2
(45) Date of Patent: Sep. 4, 2018

(54) SYSTEM AND METHOD FOR BEACON BASED DEVICE LOGIN

(71) Applicants: Kabushiki Kaisha Toshiba, Minato-ku (JP); Toshiba TEC Kabushiki Kaisha, Shiagawa-ku (JP)

(72) Inventor: Michael Yeung, Mission Viejo, CA (US)

(73) Assignees: Kabushiki Kaisha Toshiba, Minato-ku (JP); Toshiba TEC Kabushiki Kaisha, Shinahawa-ku (JP)

( * ) Notice: Subject to any disclaimer, the term of this patent is extended or adjusted under 35 U.S.C. 154(b) by 0 days.

(21) Appl. No.: 15/440,592

(22) Filed: Feb. 23, 2017

(65) Prior Publication Data

US 2018/0113654 A1 Apr. 26, 2018

Related U.S. Application Data

(60) Provisional application No. 62/410,528, filed on Oct. 20, 2016.

(51) Int. Cl.
| | |
|---|---|
| G06K 15/00 | (2006.01) |
| G06F 3/12 | (2006.01) |
| H04W 76/04 | (2009.01) |
| H04W 4/00 | (2018.01) |
| H04L 29/12 | (2006.01) |
| H04W 12/02 | (2009.01) |
| H04N 1/00 | (2006.01) |

(Continued)

(52) U.S. Cl.
CPC .......... *G06F 3/1204* (2013.01); *G06F 3/1221* (2013.01); *G06F 3/1222* (2013.01); *G06F 3/1238* (2013.01); *G06F 3/1292* (2013.01); *H04L 61/2007* (2013.01); *H04N 1/00103* (2013.01); *H04N 1/00307* (2013.01); *H04N 1/00896* (2013.01); *H04N 1/4426* (2013.01); *H04W 4/008* (2013.01); *H04W 4/80* (2018.02); *H04W 12/02* (2013.01); *H04W 76/046* (2013.01); *H04W 76/27* (2018.02); *H04N 2201/0055* (2013.01); *H04N 2201/0094* (2013.01)

(58) Field of Classification Search
CPC ................................ H04W 8/005; G06F 3/12
See application file for complete search history.

(56) References Cited

U.S. PATENT DOCUMENTS

| | | | | |
|---|---|---|---|---|
| 2009/0103124 | A1* | 4/2009 | Kimura | G06F 3/1204 358/1.15 |
| 2015/0334548 | A1* | 11/2015 | Liu | H04W 72/0473 370/329 |

* cited by examiner

*Primary Examiner* — King Poon
*Assistant Examiner* — Michael Burleson
(74) *Attorney, Agent, or Firm* — Ulmer & Berne LLP (57) ABSTRACT

A system and method beacon-based document processing device login and job handling includes a beacon configured to broadcast device identification data and a network interface network interface configured to receive user identification data from an associated, portable data device responsive to receipt of the user identification data from the beacon. A processor enables document processing hardware in accordance with received user identification data and generates indicia on the display corresponding to at least one electronic document corresponding to the user identification data. An input receives user selection data corresponding to the indicia and the processor completes a document processing operation on the at least one electronic document in accordance with received user selection data.

15 Claims, 8 Drawing Sheets

(51) Int. Cl.
*H04N 1/44* (2006.01)
*H04W 76/27* (2018.01)
*H04W 4/80* (2018.01)

SYSTEM AND METHOD FOR BEACON BASED DEVICE LOGIN

TECHNICAL FIELD

This application relates generally to document processing via multifunction peripherals. The application relates more particularly to automated login to devices using wireless beacon technology contemporaneously with wireless networking technology to facilitate device login when user devices are proximate to a multifunction peripheral.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Given the expense in obtaining and maintain MFPs, devices are frequently shared or monitored by users or technicians via a data network. MFPs, while moveable, are generally maintained in a fixed location. Until more recent times, users, which may include individuals or groups such as employees, administrators or technicians administrators of networked MFPs, were also generally in relatively fixed location. A user would typically communicate documents or other information from his or her office or workstation. An administrator or technician would also monitor devices from a workstation.

Users may send document processing jobs, such as a print request, to one or more networked devices. In a typical shared device setting, one or more workstations are connected via a network. When a user wants to print a document, an electronic copy of that document is sent to a document processing device via the network. The user may select a particular device when several are available. The user then walks to the selected device and picks up their job or waits for the printed document to be output. If multiple users send their requests to the same device, the jobs are queued and outputted sequentially. In other instances, a user may not wish to have their output waiting for them at a MFP as it may contain sensitive or confidential information. In those instances, a user may approach and enter information via an MFP user interface, such as an LCD touchscreen, which can allow the user to release their job for printing.

SUMMARY

In accordance with an example embodiment of the subject application, a system and method for beacon-based document processing device login and job handling includes a beacon configured to broadcast device identification data and a network interface configured to receive user identification data from an associated, portable data device responsive to receipt of the device identification data from the beacon. A processor enables document processing hardware in accordance with received user identification data and generates indicia on the display corresponding to at least one electronic document corresponding to the user identification data. An input receives user selection data corresponding to the indicia and the processor completes a document processing operation on the at least one electronic document in accordance with received user selection data.

BRIEF DESCRIPTION OF THE DRAWINGS

Various embodiments will become better understood with regard to the following description, appended claims and accompanying drawings wherein:

FIG. 1 an example embodiment of a beacon-based document processing system;

FIG. 2 is an example embodiment of a document rendering system;

FIG. 3 is an example embodiment of portable digital devices;

FIG. 4 is an example embodiment of a beacon-based document processing device system;

FIG. 5 is an example embodiment of a mobile application block diagram;

FIG. 6 is an example embodiment of MFP embedded application;

FIG. 7 is an example embodiment of a flowchart for a portable user device such as a smartphone;

FIG. 8 is an example embodiment of a flowchart for an MFP; and

FIG. 9 is an example embodiment of a flowchart for a user device.

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

In accordance with the subject application, FIG. 1 illustrates an example embodiment of a beacon-based document processing system 100. One or more MFPs, illustrated by MFP 104, are connected to a network 108 by any suitable wired, wireless or optical network interface. Network 108 is suitably comprised of a local area network (LAN) or wide area network (WAN) which may comprise the global Internet, or any suitable combination thereof. MFP 104 includes an associated wireless beacon 112. Suitable beacons include BLUETOOTH low energy (BLE) devices that broadcast an identifier to nearby portable electronic devices. Other suitable beacons include wireless radio frequency communication, such as near-field communication (NFC) devices, or optical data communication devices, such as infrared. Beacons may be purchased as standalone devices. Beacon devices are relatively inexpensive and can be battery powered. Beacons can be programmed to broadcast specified information to nearby devices. Beacons can be placed in any suitable location, including on or near an MFP device. Beacons may also be integrated into an MFP and may also be synthesized by programming of a bi-directional BLUETOOTH interface.

By way of further example, Apple, Inc. has its own beacon BLE version of called iBeacon and Google, Inc. has its own version called Eddystone, formerly called UriBeacon. Beacons transmit a universally unique identifier (UUID) that can be picked up receiving hardware running in concert with any compatible application or operating system. iBeacon broadcasts a UUID information packet having a unique ID number comprising three parts, UUID, Major and Minor. Eddystone broadcasts three packets including a UUID, a universal resource locator (URL) and sensor telemetry data providing information as to the beacon's status or health.

Broadcasting Power (or Transmit Power) is the power with which the beacon broadcasts its signal. Broadcasting Power directly impacts signal range. The more power, the longer the range. Beacons do not broadcast constantly. They 'blink' instead. Advertising Interval describes the time between each blink. A Received Signal Strength Indicator (RSSI) is the strength of the beacon's signal as seen on the receiving device, such as a smartphone or tablet computer. The signal strength depends on distance and Broadcasting Power value. For a typical beacon, at maximum broadcasting power (+4 dBm), an RSSI may range from −26 (a few inches) to −100 (40-50 m distance). RSSI may be used to approximate a distance between the device and the beacon using another value defined by the iBeacon standard. External factors influencing radio waves, such as absorption, interference, or diffraction, may cause a RSSI to fluctuate. The further away the device is from the beacon, the more unstable the RSSI becomes. Measured Power is a factory-calibrated, read-only constant which indicates the expected RSSI at a distance of 1 meter to the beacon. When combined with RSSI, one can estimate the distance between the device and the beacon. iBeacon defines four proximity zones for estimating the distance to a beacon:

immediate (very close to the beacon)
near (about 1-3 m from the beacon)
far (further away or the signal is fluctuating too much to make a better estimate)

These zones, or any other suitable beacon strength zones, are suitably used by a portable device to determine relative proximity and may be used as thresholds for triggering certain events.

Figure 1:
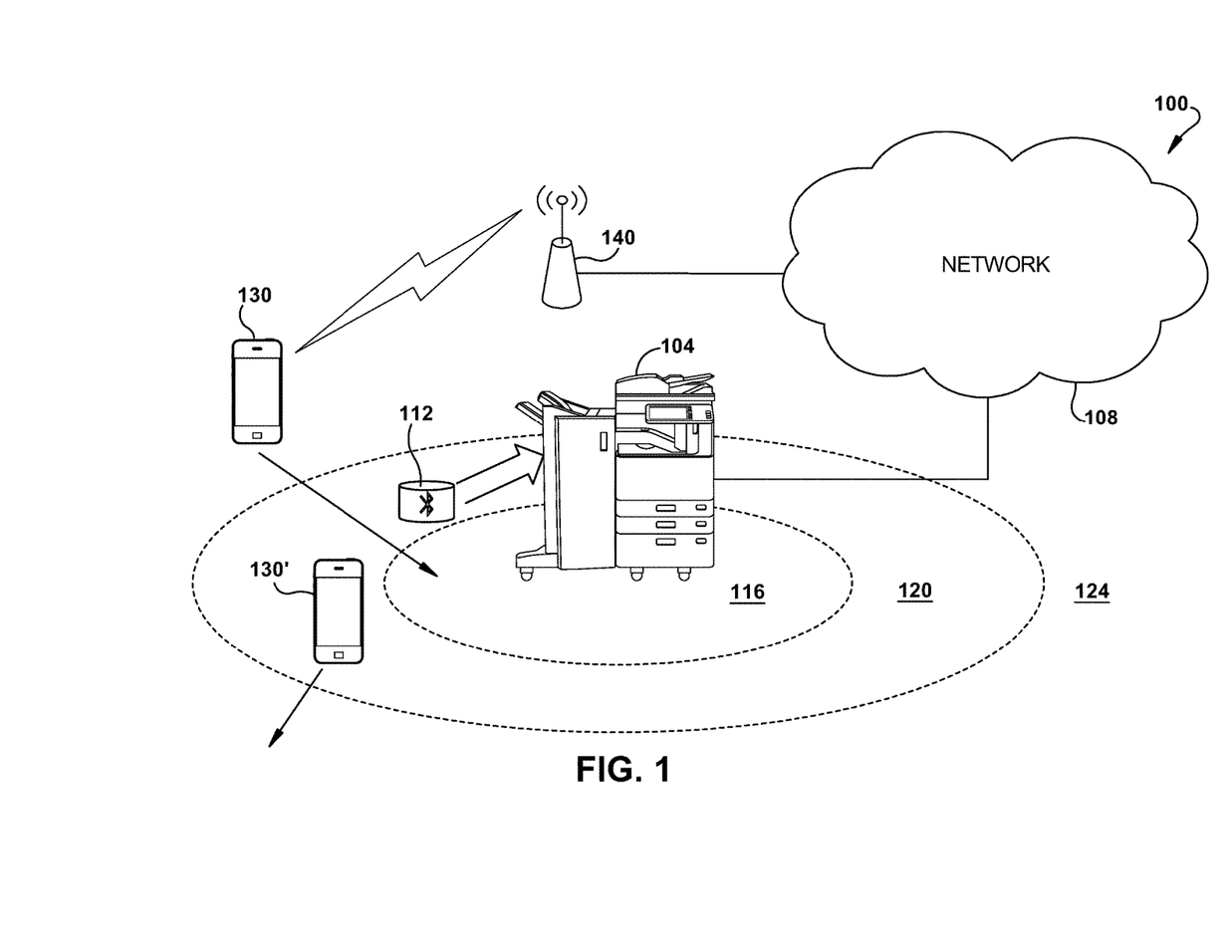

In the example embodiment of FIG. 1, beacon 112 defines immediate region 116, near region 120 and far region 124. A portable data device, such as smartphone 130 includes a wireless network interface, such as a WiFi interface, and a BLUETOOTH interface compatible to read signals broadcast from beacon 112. Smartphone 130 suitably contains user identification information associated with an owner or user and an application that allows for sensing a presence, or presence and signal strength, of a broadcast from beacon 112. When smartphone 130 moves from far region 124 into near region 120, it may determine that it is sufficiently proximate for reliable beacon data communication and obtain beacon broadcast information, such as the UUID of the beacon 112. The smartphone may receive a URL or IP address of MFP 104 directly from beacon 112. Then follows a network data communication from smartphone 130, via WiFi access point 140, to network 108. If a URL or IP address is present, smartphone 130 may initiate a data connection immediately with MFP 104. If not, smartphone may perform either an onboard lookup or a server-based lookup of a URL or IP address corresponding to the UUID before making contact with MFP 104.

In the illustrated example of FIG. 1, smartphone 130 may direct MFP 104 to wake up from a power saving state by send it an instruction when it enters near region 120. Then, as smartphone 130 moves into immediate region 116, it communicates its user ID or login information to MFP 104 via network 108. MFP 108 suitably logs in the user on the already warming up device and generates a display customized to the user which may include one or more document processing operations associated with that user. This facilitates secure and effortless logins by users who are physically proximate to a device. Data communication is done via network 108. A network session between MFP 104 and smartphone 130 is maintained while the user remains proximate to the MFP 104 and the user suitably remains logged in. When the user moves away from MFP 104, such as when smartphone 130' moves from near region 120 to far region 124, smartphone 130' senses a loss of signal strength with beacon 112 and suitably sends a logoff command to MFP 104 with which it had remained connected via network 108.

Figure 2:
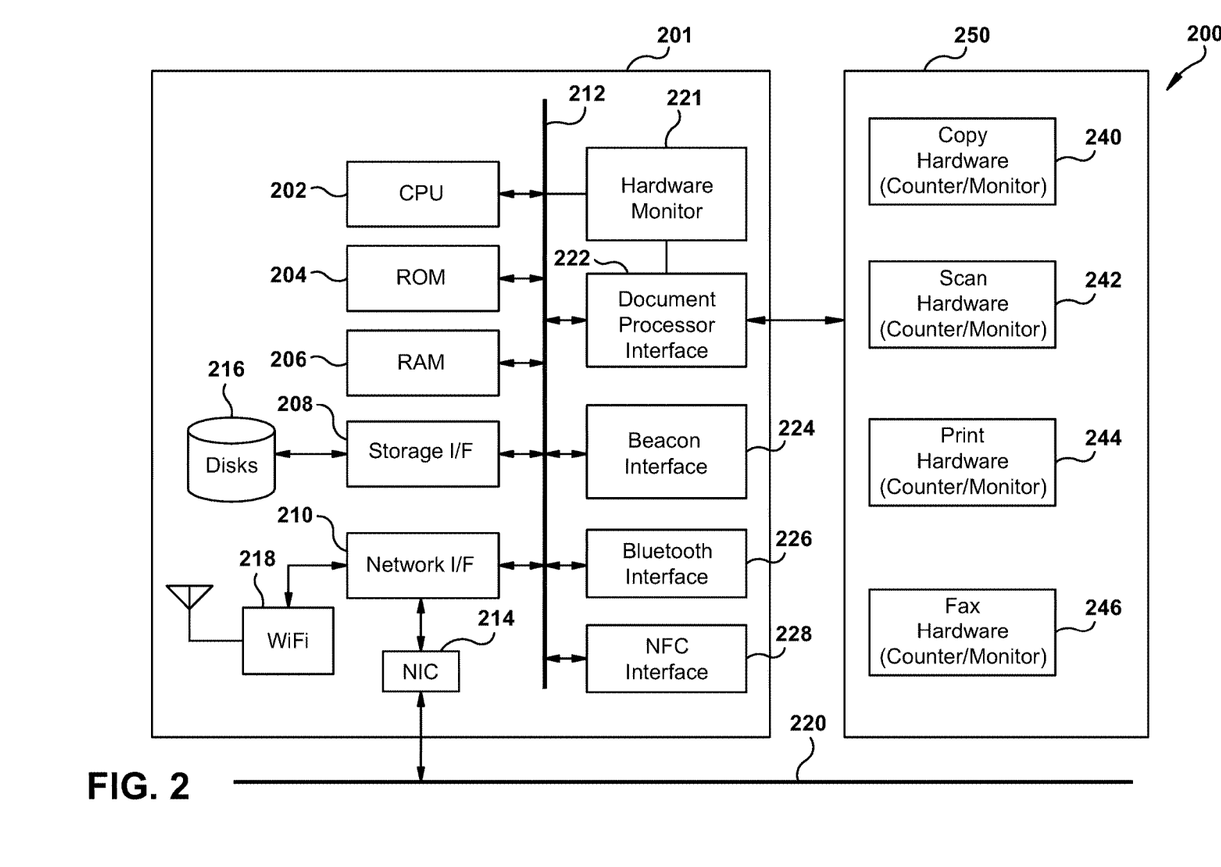

Turning now to FIG. 2, illustrated is an example embodiment of a document rendering system 200 suitably comprised within an MFP, such as with MFPs 104 of FIG. 1. Included in controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightening, telephone line, or the like.

Processor 202 can also be in data communication with any suitable user input/output (I/O) interface which provides data communication with user peripherals, such as displays, keyboards, mice, track balls, touch screens, or the like. Hardware monitor 221 suitably provides device event data, working in concert with suitably monitoring systems. By way of further example, monitoring systems may include page counters, sensor output, such as consumable level sensors, temperature sensors, power quality sensors, device error sensors, door open sensors, and the like.

Also in data communication with data bus 212 is a document processor interface 222 suitable for data communication with MFP functional units 250. In the illustrate example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Additional interfaces are suitably provided within controller 201 include a beacon interface 224 for generating broadcast beacon information. Beacon interface 224 is suitably hardware for generating a beacon. While it may be integrated with an MFP unit, other suitable beacons are stand-alone units that may be physically placed on or near an MFP. Alternatively or in addition to beacon interface 224 is a BLUETOOTH interface 226 which may be configured to act as a beacon in situations such as with BLE beacons. A near field communication (NFC) interface 228 is also suitably used and may function as a beacon interface for NFC-related beacon broadcasts.

Figure 3:
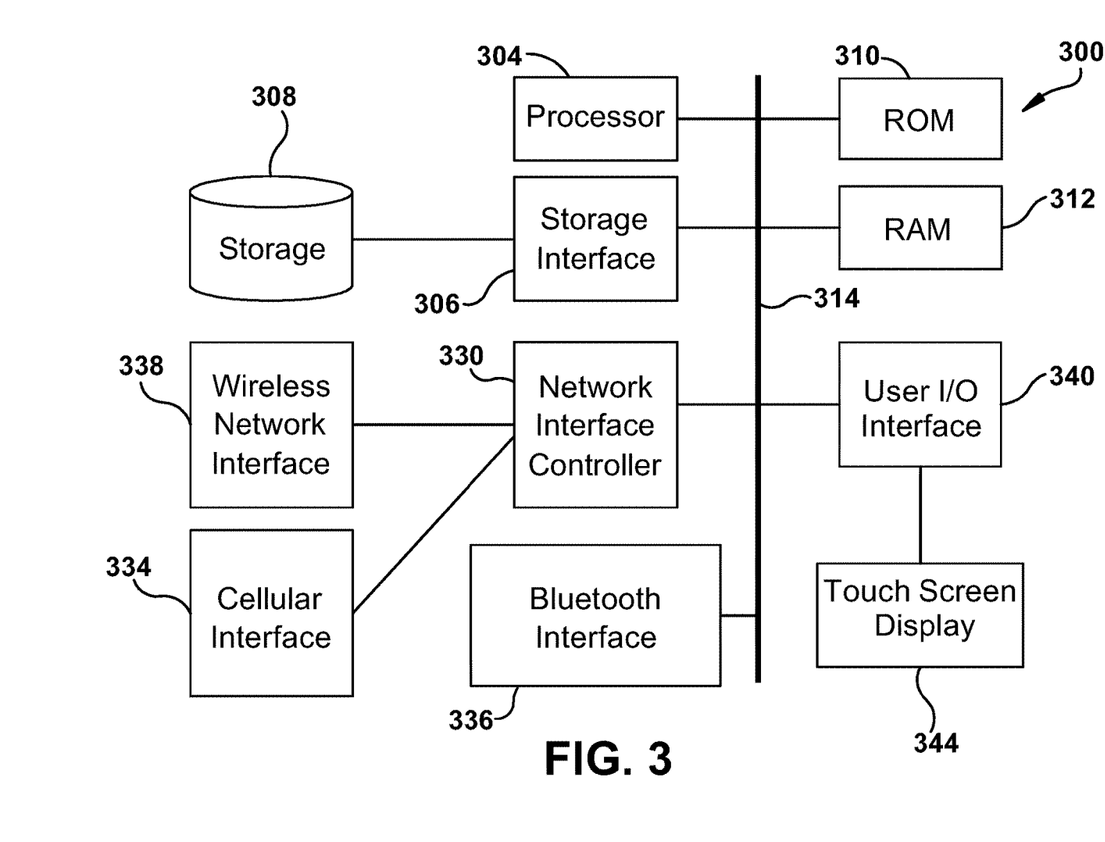

Turning now to FIG. 3, illustrated is an example embodiment of portable digital devices, such as notebook computers or tablet computers, or devices such as smartphone 130 of FIG. 1. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 306 for reading or writing to a data storage system 308, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable wired or physical network connection via cellular network interface 334, or to any suitable wireless data connection via wireless network interface 338, such as WiFi or one or more of the networks detailed above. Processor 304 is also in data communication with a beacon detector, suitably BLUETOOTH interface 336 which suitably acts as a detector for BLE beacons and includes an associated signal strength indicator.

Processor 304 is also in data communication with a user input/output (I/O) interface 340 which provides data communication with user peripherals, such as touch screen display 344, as well as keyboards, mice, track balls, touch screens, or the like. It will be understood that functional units are suitably comprised of intelligent units, including any suitable hardware or software platform.

Figure 4:
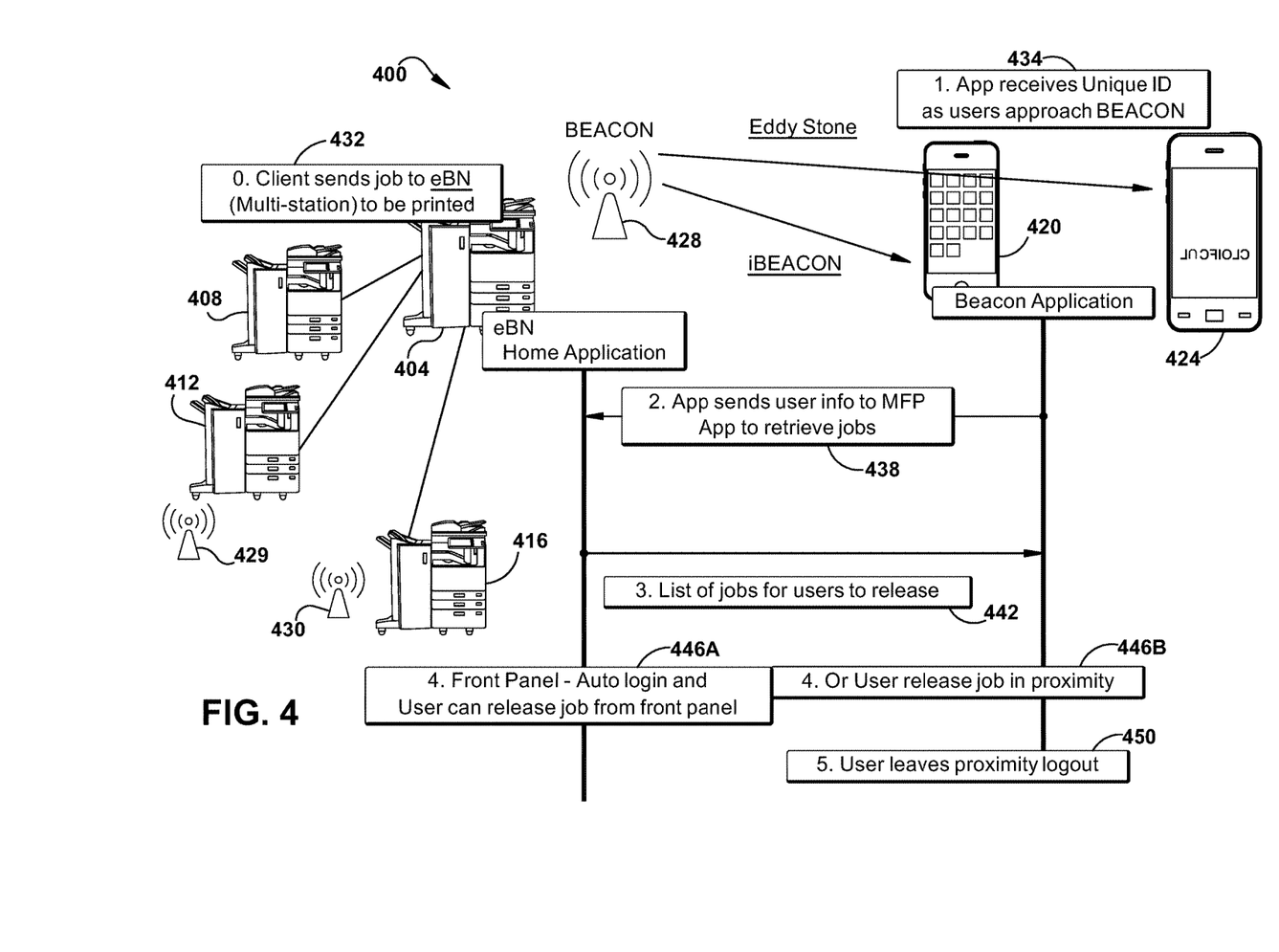

Referring next to FIG. 4, illustrated is an example embodiment of a beacon-based document processing device system 400 including MFPs 404, 408, 412 and 416. Beacon 428 is associated with MFP 404, while beacons 429 and 420 are associated with MFPs 412 and 416, respectively. Device 408 is shown as not being associated with any beacon. MFPs 404, 408, 412 and 416 are suitably in a common document processing network, such as by way of further example, eBRIDGE Next (eBN) of Toshiba TEC. A user device, such as APPLE iPHONE IOS smartphone 420 or GOOGLE ANDROID OS device 424 suitably receive a signal from a beacon, such as beacon 428 when they are sufficiently proximate as detailed above.

In the example embodiment of FIG. 4, a process is commenced at block 432 when a client sends a job to a network for printing. An app on a portable device receives a UUID as at approaches a beacon corresponding to its operating system at block 434. The App sends user login or identification information to the MFP 404, associated with beacon 428 such that MFP 404 may retrieve a job or jobs associated with that user at block 438. A list of jobs corresponding to the user is displayed on the MFP 404 user interface at block 442, which may include the user's private print jobs. Next, the user may be automatically logged in at block 446A so that the user can release one or more of their displayed jobs, or a user may release jobs in proximity at 446B, such as in situations wherein private printing is not set for one or more jobs. The user device suitably sends a logout instruction to MFP 404 via the wireless network when the user departs the area of MFP 404 as determined by signal strength of a received beacon following below a selected threshold.

Figure 5:
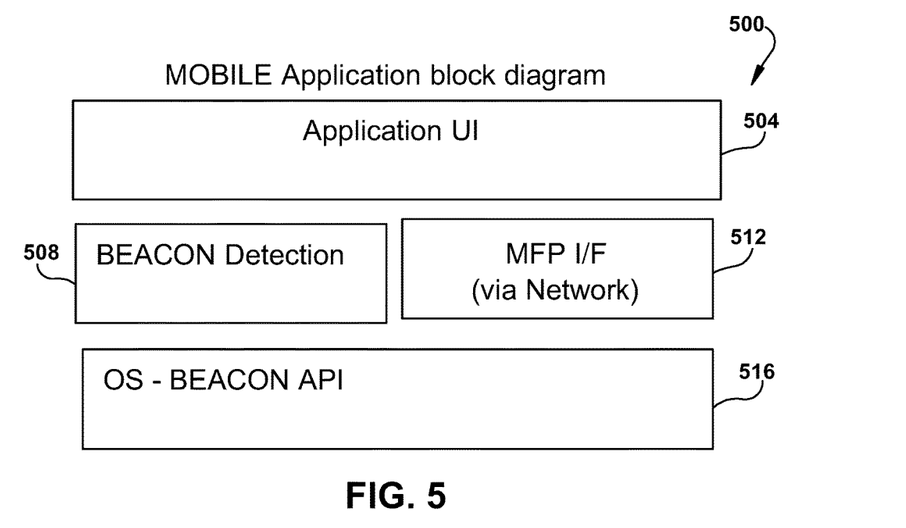

FIG. 5 illustrates an example embodiment of a mobile application block diagram 500 such as may be found on portable user data devices such as the smartphones discussed herein. Application user interface module 504 interacts with beacon detection module 508 and network interface module 512 which, in turn, integrate with an operating system/beacon application program interface module 516.

Figure 6:
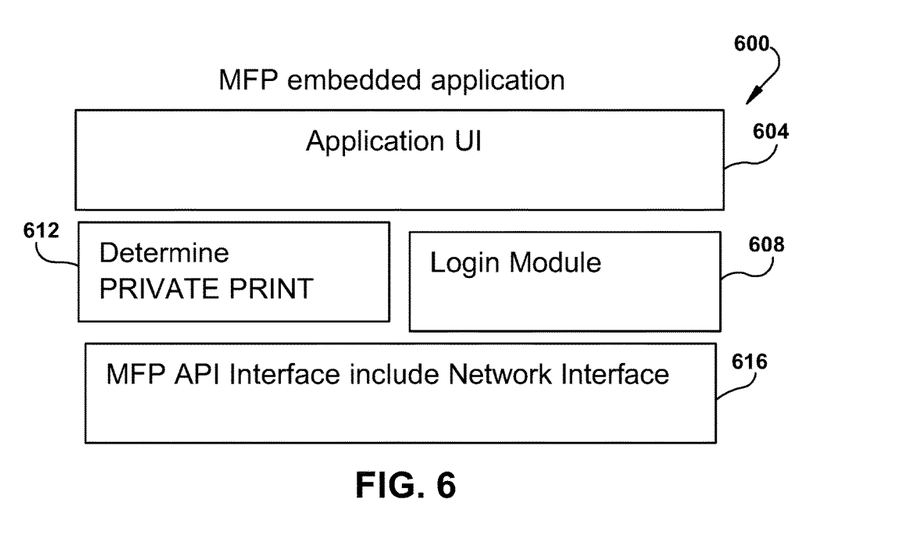

FIG. 6 illustrates an example embodiment of an MFP embedded application block diagram 600 that includes an application user interface module 604. Module 612 determines whether jobs associated with a user are designated as private print, and login module 608 facilitates a user login to an MFP via a network. MFP application program and network interface 616 provides for networked communication between the user device and the MFP determined to be in range via a beacon.

Figure 7:
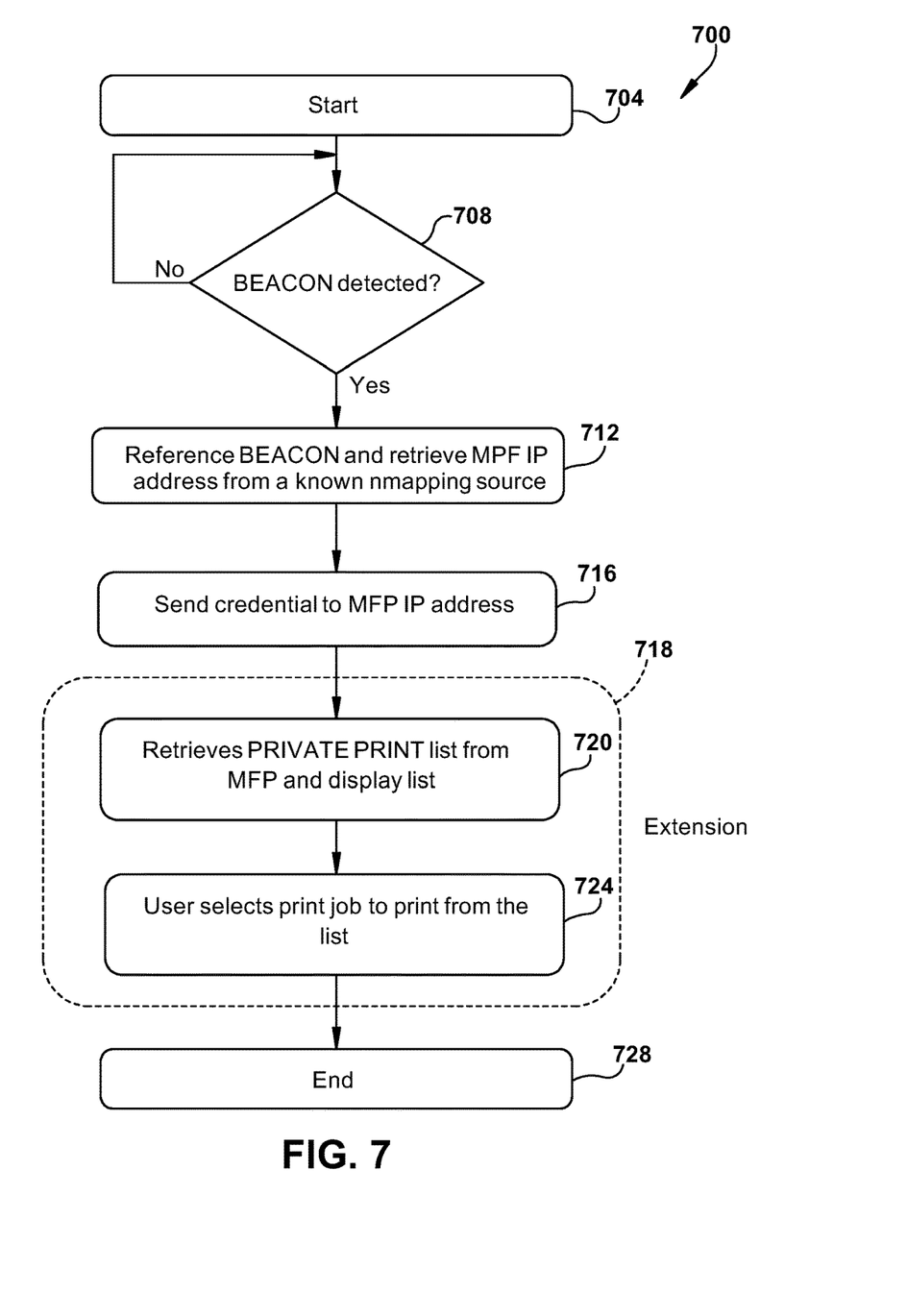

FIG. 7 illustrates an example embodiment of a flowchart 700 for a portable user device such as a smartphone. The process commences at block 704 and proceeds to block 708 where it remains until a beacon is detected. Once a beacon is detected, an identity of a corresponding MFP is determined either directly from the beacon, such as from its UUID, or via local or remote lookup for MFP device address information corresponding to received beacon data. Once an address for the MFP is identified, credentials are sent to the MFP at block 716. MFP-related activity at block 718 includes retrieval of a private print list corresponding to received credentials at bloc 720 and receipt of user selection for printing at block 724. The process suitably ends at block 728.

Figure 8:
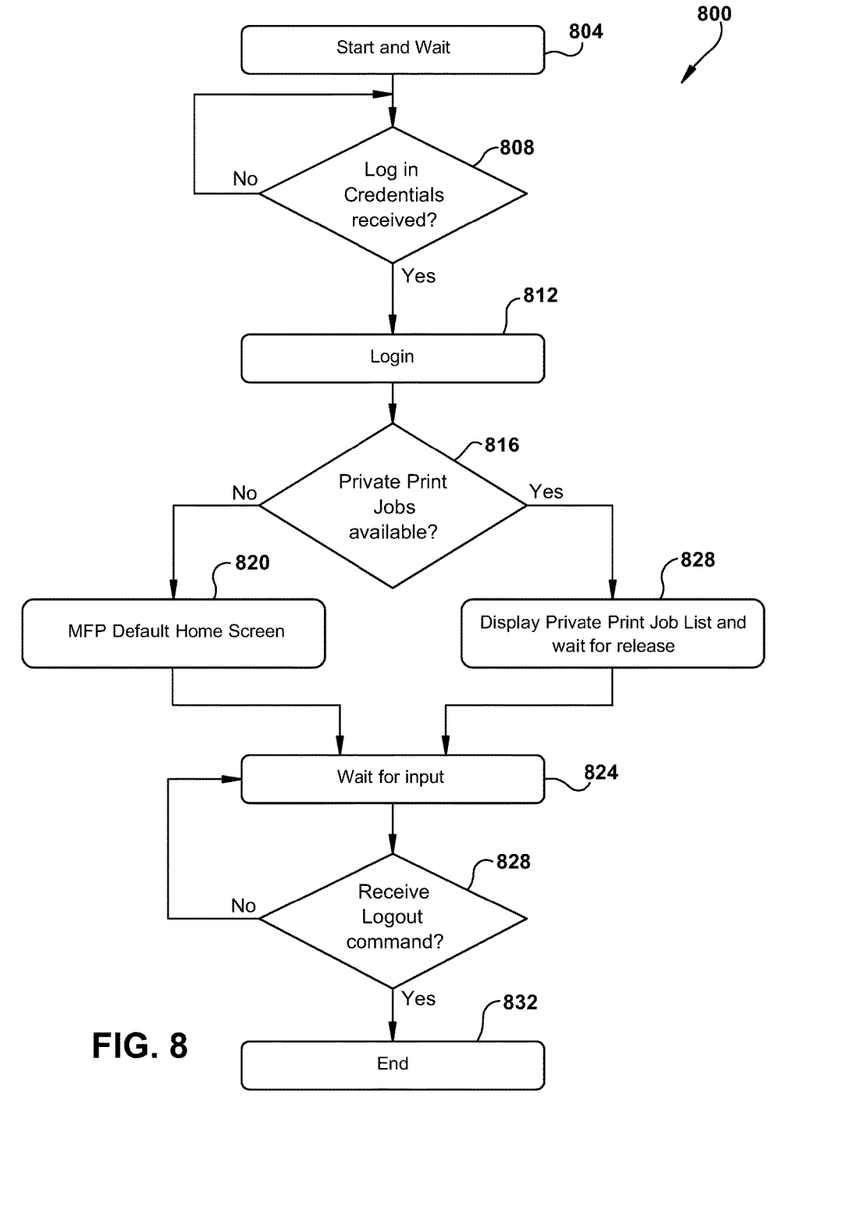

Turning next to FIG. 8, illustrated is an example embodiment of a flowchart 800 for an MFP. The system commences at block 804 and proceeds to block 808 where it remains until login credentials corresponding to that that devices beacon are received. Once received, the device logs in the user at block 812 and determines whether private prints are available at block 816. If not, an MFP default home screen is suitably displayed on the MFP user interface at block 820. The default screen may also appear on a user interface of the user device. If private prints are found at block 816, they are displayed for selection at block 828. Progress from both block 820 and block 828 goes to block 824 where user selections are processed. User selections and associated displays remain until a device logout is received at block 828, after which time the MFP is logged out from the associated user.

Figure 9:
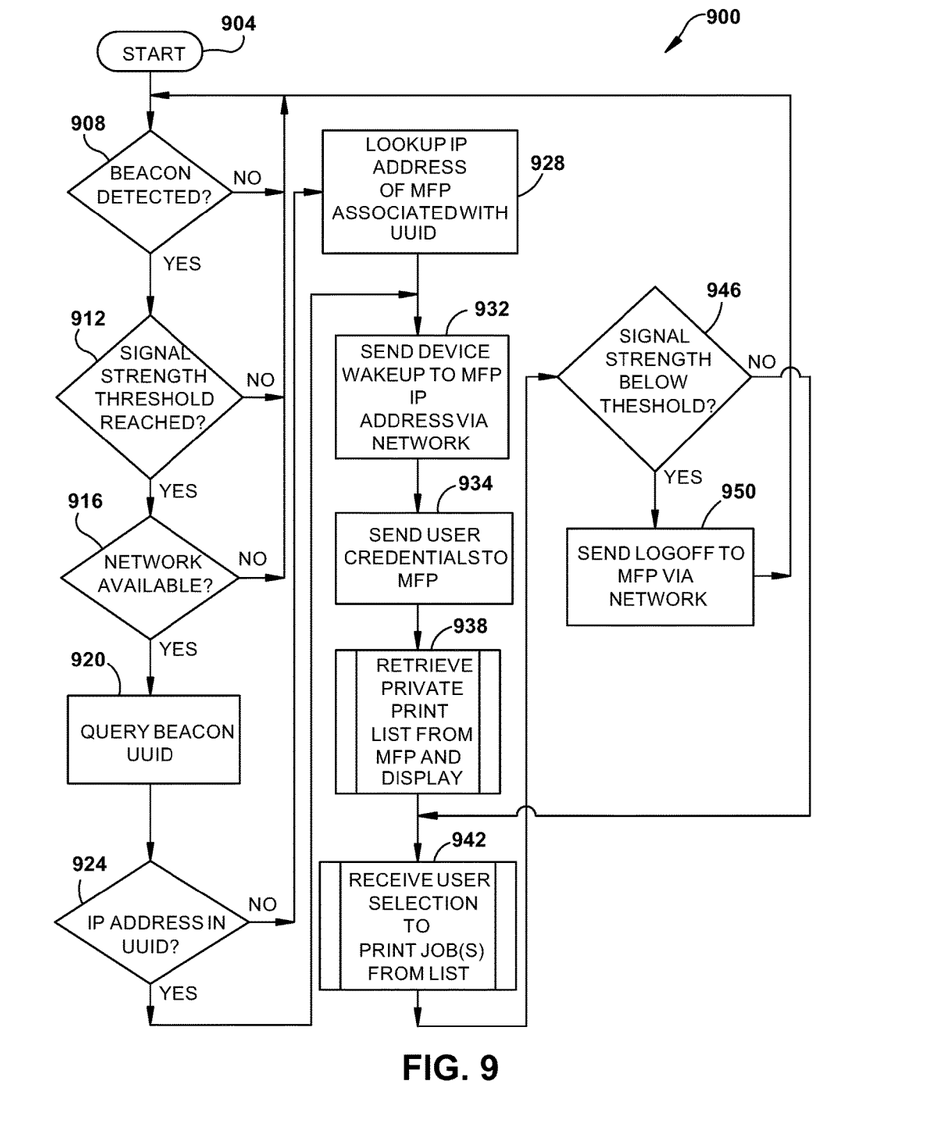

FIG. 9 illustrates an example embodiment of a flowchart for a user device 900, such as a smartphone as detailed above. The process commences at block 904 and proceeds to block 908 where it remains until a beacon is detected. Once a beacon is detected, a check is made at block 912 to determine if a signal strength threshold has been achieved. If not, the process returns to block 908. If so, a determination is made at block 916 as to whether a network connection is present. If not, the process again returns to block 908. If so, the beacon UUID is queried at block 920. IF an MFP is not directly identified in a UUID, than an address lookup is completed at block 928. Once an MFP device address is determined, either directly from a UUID or from a lookup, a device wakeup instruction is sent to the identified MFP via the network at block 932. Next, user credentials or device login instructions are sent to the MFP at block 934. A private print list is displayed at block 938 and user selection from this list made at block 942. If a determination that beacon signal strength has not fallen below a selected threshold at block 946, the user stays logged into the MFP and may make selections at the device interface at block 942. If signal strength falls below the selected threshold, a logoff instruction is sent to the MFP and the device suitably returns for subsequent beacon detection at block 908.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A document processing device comprising:
   a beacon configured to broadcast device identification data;
   a display;
   a network interface network interface configured to receive user identification data from an associated, portable data device responsive to receipt of the device identification data;
   a signal strength indicator configured to store data indicative of a first signal strength level associated with a distance between the beacon and the portable data device;
   a processor configured to initiate a document processing device wakeup in accordance with the stored data indicative of the first signal strength;
   receiving data from a signal strength indicator indicative of a first signal strength level associated with a distance between the beacon and an associated, portable data device;
   initiating a document processing device wakeup instruction in accordance with receipt of data indicative of the first signal strength level;
   receiving data from the signal strength indicator indicative of a second signal strength level between the beacon and the associated, portable data device, wherein the second signal strength level is greater than the first signal strength level;
   receiving user identification data from an associated, portable data device responsive to receipt of the device identification data;
   sending the user identification data to the multifunction peripheral via the network interface when the measured signal strength achieves a preselected login threshold indicative of a stronger signal strength relative to a device wakeup threshold;
   enabling document processing hardware in the document processing device in accordance with received user identification data and receipt of data indicative of the second signal strength level;
   generating indicia on an associated display corresponding to at least one electronic document corresponding to the user identification data;
   receiving user selection data corresponding to the indicia; and
   the signal strength indicator further configured to store data indicative of a second signal strength level between the beacon and the portable data device, wherein the second signal strength level is greater than the first signal strength level;
   the processor further configured to enable document processing hardware in accordance with received user identification data and the stored data indicative of the second signal strength level, the processor further configured to generate indicia on the display corresponding to at least one electronic document corresponding to the user identification data;
   an input configured to receive user selection data corresponding to the indicia;
   the processor further configured to send the user identification data to the multifunction peripheral via the network interface when the measured signal strength achieves a preselected login threshold indicative of a stronger signal strength relative to a device wakeup threshold; and
   wherein the processor is further configured to complete a document processing operation on the at least one electronic document in accordance with received user selection data.

2. The document processing device of claim 1 wherein the processor is further configured to generate the indicia as a display list of at least one private print job associated with the user identification data.

3. The document processing device of claim 1 wherein the beacon comprises a BLUETOOTH low energy transmitter configured to broadcast device identification data comprised of a universally unique identifier associated with the document processing device.

4. The document processing device of claim 3 wherein the device identification data includes network location information of the document processing device.

5. The document processing device of claim 4 wherein the network location information is comprised of an IP address for the document processing device.

6. The document processing device of claim 5 wherein the processor is configured to disable document processing hardware in accordance with logoff data received from the portable data device via the network interface.

7. A method comprising:
   broadcasting device identification data corresponding to a document processing device via a wireless beacon;
   completing a document processing operation on the at least one electronic document in accordance with received user selection data.

8. The method of claim 7 further comprising generating the indicia as a display list of at least one private print job associated with the user identification data.

9. The method of claim 7 further comprising broadcasting device identification data via a BLUETOOTH low energy transmission including device identification data having a universally unique identifier associated with the document processing device.

10. The method of claim 9 wherein the device identification data includes network location information of the document processing device.

11. The method processing device of claim 10 wherein the network location information is comprised of an IP address for the document processing device.

12. The method of claim 11 further comprising disabling document processing hardware in accordance with logoff data received from the portable data device via the network interface.

13. A system comprising:
   a BLUETOOTH low energy receiver interface configured to receive beacon data corresponding to a multifunction peripheral;
   a memory configured to store received beacon data;
   a processor configured to extract a UUID from received beacon data; and
   a network interface, and wherein the processor is further configured to send user identification data to the multifunction peripheral via the network interface in accordance with extracted UUID data;

a signal strength indicator configured to determine a signal strength corresponding to received beacon data, and wherein the processor is further configured to send a device wakeup instruction to the multifunction peripheral via the network interface when a measured signal strength achieves a preselected device wakeup threshold;

the processor configured to send the user identification data to the multifunction peripheral via the network interface when the measured signal strength achieves a preselected login threshold indicative of a stronger signal strength relative to the device wakeup threshold.

14. The system of claim 13 further comprising:

a signal strength indicator configured to determine a signal strength corresponding to received beacon data, and wherein the processor is further configured to send signal strength data to the multifunction peripheral via the network interface.

15. The device of claim 14 wherein the processor is further configured to send a logoff instruction to the multifunction peripheral via the network interface when the measured signal strength falls below a logoff threshold.

* * * * *